United States Patent [19]

Michling et al.

[11] 3,885,656
[45] May 27, 1975

[54] WINCH WITH GEARING AND BRAKE INSIDE OF A CLOSED DRUM

[75] Inventors: Wilhelm Michling, Hattingen; Heinz Rauscher, Witten, both of Germany

[73] Assignee: Mannesmann-Meer AG, Monchen-Gladbach, Germany

[22] Filed: Jan. 28, 1974

[21] Appl. No.: 437,113

[30] Foreign Application Priority Data
Jan. 26, 1973  Germany............................ 2304370
Feb. 6, 1973   Germany............................ 7304814

[52] U.S. Cl.............. 192/4 R; 254/150 R; 308/176; 74/411.5
[51] Int. Cl......................... F16h 57/00; B66d 1/30
[58] Field of Search.................... 192/4 R, 6 A, 6 B; 254/150 R; 74/411.5

[56] References Cited
UNITED STATES PATENTS
3,599,937  8/1971  Carter................................. 192/4 R
3,627,087  12/1971 Eskridge......................... 254/150 R

*Primary Examiner*—Benjamin W. Wyche
*Attorney, Agent, or Firm*—Ralf H. Siegemund

[57] ABSTRACT

In a winch for ropes or cable, having a drum receiving and being connected to for being driven by at least one planetary gear, the drum is journalled by means of ball or roller bearings disposed to both sides (axially) of the ring gear of the planetary gear, a driving shaft is journalled in a stationary part of the winch to which is also connected the said ring gear for remaining stationary therewith, the stationary part of the winch extending into the drum and circumscribing the driving shaft; a supporting annulus having a cylindrical, sleeve-like portion bears against but is not secured to the drum, and in a cylindrical interface therewith; the sleeve has an annular groove holding a sealing ring which bears against the drum at said interface to provide sealing between the annulus and the drum; an outer race as part of one of the bearings is mounted to the inside of said sleeve; an inner race of that one bearing is disposed on the stationary part as extending into the drum; the supporting annulus has an inwardly directed flange on the side of the said one bearing facing axially the exterior of the drum; oil tight, radial sealing rings are disposed between said stationary part on one hand and the flange and the shaft on the other hand. These rings, the annulus, the stationary shaft and the shaft itself close to one side of the drum; the other side of the drum is closed by a bottom with oil drainage openings.

4 Claims, 2 Drawing Figures

WINCH WITH GEARING AND BRAKE INSIDE OF A CLOSED DRUM

BACKGROUND OF THE INVENTION

The present invention relates to a winch with a planetary gear disposed inside of a closed drum and wherein the annular gear of the planetary gear is connected to the frame or stand of the winch; the sun wheel of the planetary gear is disposed on the drive shaft as introduced into the interior of the drum and drives the planet gears whose spider is drivingly connected to the drum.

Winches of this type are known generally and it is also known to have the drum journalled on both sides of the planetary gear, using roller bearings for journalling the drum on a stationary support as well as on the shaft. Moreover, such a winch may include a brake on the frame for braking and holding the drum.

In order to install the planetary gear in the drum, the latter is provided for being openable on one side, and the opening is later closed through a lid or the like. Bearings are provided in the lid for supporting the drum relative to the gear elements. If the lid is not to be secured to the drum, the drum can be journalled on stationary gear parts only when the supporting bearing of the drum is located on the outside. The bearing will have a very large diameter in that case and will be quite expensive. Moreover, it was found difficult to seal the drum once closed at the bearings. Sealing is, however, a prerequisite because the drum is to be filled with oil.

DESCRIPTION OF THE INVENTION

It is an object of the present invention to avoid the difficulties outlined above and to provide for a winch to be used as rope or cable winch and which is more compact and constructively simpler than the prior art devices.

It is another object of the present invention to provide for improvements in a winch having a drum which receives and is connected to the driven output of at least one planetary gear which is being driven by a shaft extending also into the drum, and wherein the drum is journalled to a stationary part extending into the drum and circumscribing the shaft, by means of two bearings disposed (axially) to both sides of the ring gear of the planetary gear.

In accordance with the preferred embodiment of the invention it is suggested to provide a supporting annulus with a cylindrical, sleeve-like portion bearing against but not being secured to the drum and in a cylindrical interface therewith; the sleeve has an annular groove for receiving a sealing ring providing sealing action as against the drum. One of the ball or roller bearings for journalling the drum has its outer race mounted to the inside of the sleeve while the inner race is disposed on the stationary part as extending into the drum and receiving the shaft. The supporting annulus has additionally an inwardly directed flange and a first, oil tight radial sealing ring is disposed between this flange and the said stationary part while a second such ring is disposed between the stationary part and the shaft. The sealing rings, the flange, the stationary part, the supporting annulus and the shaft together close one axial end of the drum and provide oil tight sealing thereof. The other end of the drum is simply closed with a bottom but may have an oil discharge opening.

As a consequence, sealing of the drum at the driven, input side occurs in several stages. The sealing surface of largest diameter is established between the supporting annulus and the drum by means of a non-sliding sealing, whereas sliding seals are of smaller diameter and are located between the stationary part on the one hand, and annulus and shaft (rotating at different speeds) on the other hand. The annulus carries the drum and is normally carried along by the rotation thereof, but displacement between these parts is permitted, for example axial displacements for preventing axial force transmission on the particular bearing.

The interior of the drum is preferably used as lubricant container for the gears and is, therefor, filled, e.g., with oil.

The resulting winch is well suited for large dynamic loads. Any heat developed by and in the gear is taken up readily by the oil filling. The amount of oil available here is significant and the entire periphery of the drum is available for heat exchange of the hot oil with the environment.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description in which:

Proceeding now to the detailed description of the drawings, FIG. 1 illustrates a closed drum 1 with a bottom annulus 1a at one end and a cover 1b to close off one side of the drum. The other side of the drum is closed by a particular structure to be described shortly.

Figure 1:
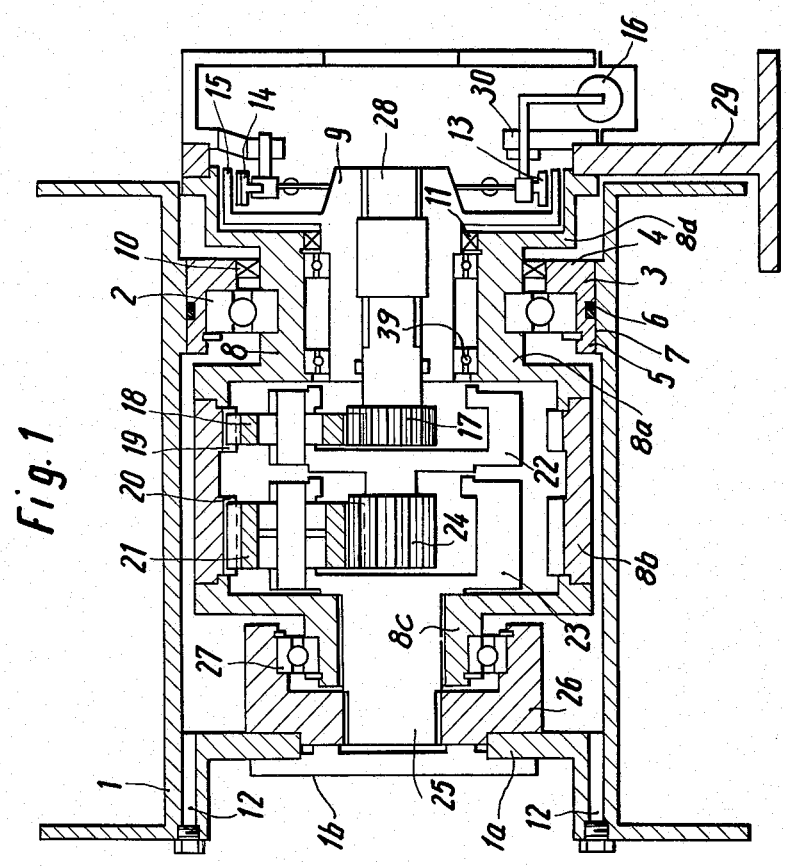
FIG. 1 illustrates a cross-section through a winch constructed in accordance with the preferred embodiment of the invention.
Figure 2:
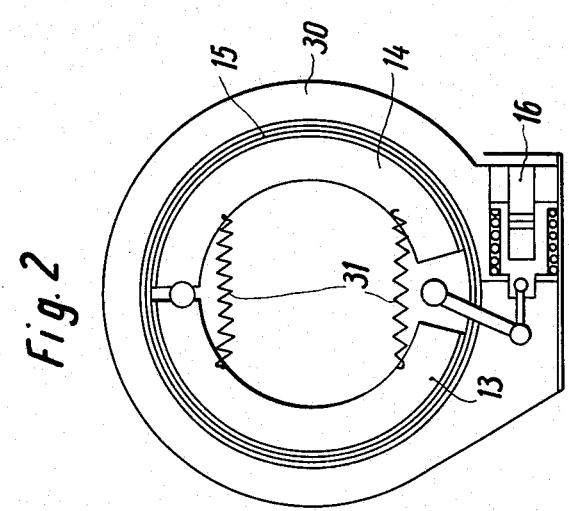
FIG. 2 shows somewhat schematically a brake for use in the same winch.

A two stage planetary gear is provided inside of the drum. The two gears respectively have internal ring gears 19 and 20, sun gears 17 and 24, planet gears 18 and 21 and spiders or planet gears carriers 22 and 23, whereby the elements 17, 18, 19 and 22 constitute the first planetary gear, while elements 20, 21, 23 and 24 constitute the second planetary gear.

A drive shaft 9 is provided inside of the drum and having a bore 28 for connection to the drive shaft of a motor (not shown) to provide the rotary input for the winch. The sun wheel 17 of the first planetary gear is secured to shaft 9 for rotation therewith.

The two planetary gears are interconnected for purposes of providing a two stage train in that the carrier 22 of the first planetary gear is connected to the sun wheel 24 of the second planetary gear. The carrier 23 of the latter is secured to a shaft 25 which constitutes the output shaft of the two stage planetary train. The shaft 25 is connected to (e.g., keyed to) a connecting and transmission member 26 which is secured to drum 1.

Reference numeral 8 refers to a stationary support part for the two planetary gears, which in turn is connected to the frame 29 of the winch. The support part 8 is generally of tubular construction having a first end sleeve 8a in which is journalled shaft 9 by means of a pair of roller bearings 39; a second, oppositely located end sleeve 8c of the support part 8 is traversed by output shaft 25; and the central portion 8b of part 8 has large diameter and contains the two planetary gears; particularly the two ring gears 19 and 20 are affixed to the inner periphery of that stationary tubular part 8b.

The drum 1 is journalled by means of a first bearing 2, journalling the drum particularly on the first sleeve 8a of stationary part 8, adjacent to the rotary input side of the system. A second bearing 27 for drum 1 is disposed on the other side of the planetary gears and between (radially) the second stationary end sleeve 8c of part 8 and an annulus 26 which is affixed to drum bottom 1a. Journalling of the drum involves the following particulars.

An annulus 3 is provided for rotating in unison with drum 1 but without being connected thereto. Annulus 3 has a cylindrical portion 5 bearing against and interfacing with an annular or cylindrical face 7 of drum 1. Cylindrical portion 5 has a groove receiving a sealing ring 6.

Since part 3 is just seated in drum 1 it will rotate therewith, so that the large diameter seal 6-against-7 is stationary. However annulus 3 can be displaced axially as well as rotationally to take up, e.g., any irregularities in motion of the drum so as to keep such displacements from bearing 2.

Annulus 3 is secured on its inside to the outer race of bearing 2, while the inner race of that bearing is supported on stationary sleeve 8a of member 8. Annulus 3 has additionally an inwardly directed flange or collar 4, and an oil tight, radial sealing ring 10 is interposed between collar 4 and the outer periphery of part 8a. Another oil tight radial sealing ring 11 is interposed between stationary part 8 and shaft 9. The first end sleeve 8a has an outer flanged part 8d by means of which part 8 as a whole is affixed to base or frame 29. The end flange 8d serves also as cover but does not seal the drum. This end of the drum is closed by means of parts 3, 10, 8a, 11 the latter providing for sealing introduction of shaft 9 into the interior of the drum.

Drum bottom 1a is provided with several oil discharge ducts or channels 12. The element 26 adjacent that drum bottom carries the outer race of another roller bearing 27, whose inner race is mounted to the second end sleeve 8b of stationary member 8.

One can see that the drum 1 actually extends axially beyond the closed and closing portion adjacent the rotary input side, and a brake 13 is provided in that area. The brake includes a stationary brake shield 30 which is connected to frame 29 and does not participate in the rotation; the brake includes additionally a braking drum 15 on shaft 9, jaws or shoes 13 and 14 and an actuator mechanism 16 for causing the jaws to engage drum 15 when braking is desired.

The actuating mechanism may be a hydraulic piston/cylinder arrangement forcing the shoes 13 and 14 against the drum 15. Return springs 31 disengage the shoes from the drum when the hydraulics is relieved.

One could provide for another bearing for the drum and to be mounted in a bearing block of the frame. However, this additional bearing does not have to be provided for if the drum is supported on one side only.

The invention is not limited to the embodiments described above but all changes and modifications thereof not constituting departures from the spirit and scope of the invention are intended to be included.

I claim:

1. In a winch for ropes or cable, having a drum receiving and being connected to for being driven by at least one planetary gear, further having a brake for the drum, the drum being journalled by means of ball or roller bearings disposed to both sides (axially) of the ring gear of the planetary gear, a driving shaft journalled in a stationary part of the winch to which is also connected the said ring gear for remaining stationary therewith, the stationary part of the winch extending into the drum, circumscribing the driving shaft, the improvement comprising:

a supporting annulus having a cylindrical, sleeve-like portion bearing against but not being secured to the drum, in a cylindrical interface, there being an annular groove in said sleeve, holding a sealing ring which bears against the drum at said interface to provide sealing between the annulus and the drum;

an outer race as part of one of said bearings being mounted to the inside of said sleeve;

an inner race of said one bearing being disposed on the stationary part as extending into the drum;

the supporting annulus having an inwardly directed flange on the side of the said one bearing facing axially the exterior of the drum;

a first oil-tight, radial sealing ring between said flange and said stationary part; and a second oil-tight, radial sealing ring between said stationary part and said shaft, said first and second sealing ring together with said annulus, said stationary part and said shaft closing one axial end of said drum.

2. In a winch as in claim 1, the drum having an axial extension, the brake being disposed in said extension.

3. In a winch as in claim 2, the brake being constructed as shoe brake having a shield which is connected to said stationary part, the brake having a drum connected to said shaft.

4. In a winch as in claim 1, there being an closable oil discharge opening on the other end of said drum.

* * * * *